Aug. 27, 1929.  M. W. McCONKEY  1,726,445
FOUR-WHEEL BRAKE
Filed March 28, 1925
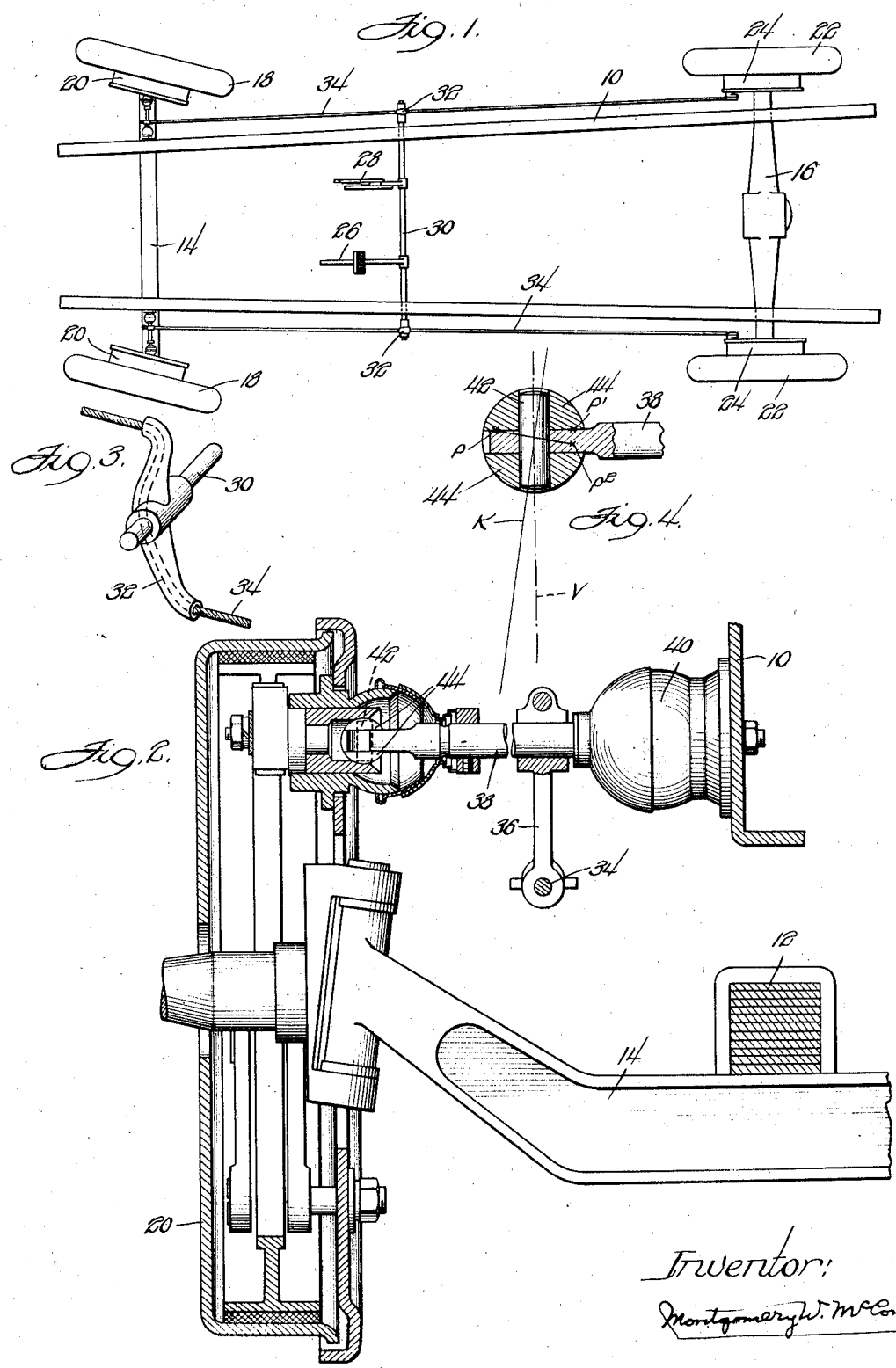
Inventor:
Montgomery W. McConkey Patented Aug. 27, 1929.

1,726,445

UNITED STATES PATENT OFFICE.

MONTGOMERY W. McCONKEY, OF FERNDALE, MICHIGAN, ASSIGNOR TO THE BENDIX CORPORATION, OF CHICAGO, ILLINOIS.

FOUR-WHEEL BRAKE.

Application filed March 28, 1925. Serial No. 18,981.

This invention relates to brakes, and is illustrated as embodied in the chassis of an automobile having brakes on all four wheels. An object of the invention is to arrange the brake-operating mechanism in such a manner that the pressure on one of the rear brakes, and preferably also on the corresponding front brake, is relieved or otherwise varied when the wheels are swivelled. This is not only of advantage in steering, and in guarding against locking the wheels on a turn, but also permits use of an ordinary set of brakes (by swivelling the front wheels) to hold one rear wheel from spinning when it loses traction in mud, etc.

In one desirable arrangement, the front brakes are so arranged that swivelling the front wheels releases the outer brake, and each front brake is equalized against the corresponding rear brake, i. e. against the rear brake on the same side of the vehicle. While the right brakes may be equalized against the left brakes if desired, I prefer to use non-equalizing connections from the pedal or other operating means.

The above and other objects and features of the invention, including various novel combinations of parts and desirable particular constructions, will be apparent from the following description of one illustrative embodiment shown in the accompanying drawings, in which:

Figure 1 is a top plan view of an automobile chassis embodying the invention;

Figure 2 is a vertical section through one front brake and its associated mechanism;

Figure 3 is a perspective view of one of the equalizers; and

Figure 4 is a diagram illustrating the release of the front brake.

In the arrangement selected for illustration, the chassis includes a frame 10 supported by springs 12 on a front axle 14 and rear axle 16, the front wheels 18 having brakes 20 being swivelled to the ends of the front axle 14 and the rear drive wheels 22 having brakes 24 supporting the rear axle 16.

The brakes are operated either by a pedal 26 or an emergency lever 28, either of which rocks a cross shaft 30, at opposite ends of which are sleeves or hollow tensioning arms 32 through which slide cables 34. Thus, as each cable is connected to the cam-operating arm of a rear brake 24 at one end, and to an arm 36 operating one front brake 20 at its other end, the hollow arms 32 may be regarded as equalizers, each arranged between the front and rear brakes on the same side of the vehicle.

Each arm 36 is shown secured to a shaft 38, slidably held at its inner end by a universal joint 40 carried by a side member of frame 10, and flattened at its outer end to be swivelled by a vertical pin 42 carried by two segmentally-cylindrical connecting devices 44 journalled in a cross bore in the end of the camshaft 46 above and substantially in line with the king pin about which the wheel swivels in steering. Thus it will be seen that rocking shaft 30 applies all four brakes, and that each rear brake is equalized against the corresponding front brake.

Since the axis "V" (Fig. 4) of the pin 42 is arranged at an angle to the axis "K" of the king pin about which the wheel swivels, as is now customary with "Perrot type" controls, those skilled in the art will recognize that when the wheels are swivelled to turn a corner the outer front brake (and therefore also the outer rear brake) will automatically be released. Thus, to exaggerate, if a point "$p$" on the base of one connecting member 44 be selected, and if the wheel is swivelled about the axis "K", the point would, if permitted, swing in a plane at right angles to "V" and arrive at some point "$p^1$". This, however, it cannot do, being forced to turn instead about axis "K", so that it is forced to a position "$p^2$", thus forcing the members 44 to turn about their cross axis, to release the brake on the outside of the turn and tighten the brake on the inside of the turn.

While one illustrative embodiment has been described in detail, it is not my intention to limit the scope of the invention to that particular embodiment, or otherwise than by the terms of the appended claims.

I claim:

1. A vehicle having, in combination, swivelled front wheels having brakes, rear road wheels having brakes, mechanical means for applying the brakes with substantially equal pressure on the two front brakes and on the two rear brakes when the vehicle is moving straight forward, and means for varying the pressure on the front and rear brakes on the same side of the vehicle when the front wheels are swivelled.

2. A vehicle having, in combination, swivelled front wheels having brakes, rear road wheels having brakes, mechanical means for applying the brakes with substantially equal pressure on the two front brakes and on the two rear brakes when the vehicle is moving straight forward, and means for releasing the front and rear brakes on the same side of the vehicle when the front wheels are swivelled.

3. A vehicle having, in combination, swivelled front wheels having brakes, rear road wheels having brakes, mechanical means for applying the brakes with substantially equal pressure on the two front brakes and on the two rear brakes when the vehicle is moving straight forward, and means for releasing the front and rear brakes on the outer side of the turn when the front wheels are swivelled to steer around a corner.

4. A vehicle having, in combination, swivelled front wheels having brakes so arranged that the outer brake is automatically released by swivelling the wheels, rear wheels having brakes, means to equalize each front brake against the rear brake on the same side of the vehicle, and means for applying all four brakes.

5. A vehicle having, in combination, swivelled front wheels having brakes, rear wheels having brakes, operating mechanism for the right front and rear brakes including an equalizing means between the brakes and a device for applying the front brake comprising a universal joint with its vertical axis at an angle to the steering axis of the wheel to be released and to release the rear brake when the wheel is swivelled on the outside of a turn, similar mechanism for the left front and rear brakes, and driver-controlled means for applying both mechanisms.

6. A vehicle having, in combination, swivelled front wheels, rear wheels having brakes, and mechanical means operated by swivelling the front wheels for releasing the outside rear brake on a turn.

7. A vehicle having, in combination, swivelled front wheels, rear wheels having brakes, and operating connections for the rear brakes extending from the front wheels and including parts affected by swivelling the front wheels to release the outer rear brake on a turn.

8. A vehicle having, in combination, a pair of rear brakes, a pair of front brakes so arranged that the outer one is relieved on a turn, a driver-operated intermediate cross rockshaft, and connections from each end of the rockshaft to the front and rear brakes on that side of the vehicle, the connections being shiftable so that the relief of one of the front brakes on a turn will automatically relieve the pressure on the corresponding rear brake.

9. A vehicle having rear brakes and swivelled front wheels having brakes, and comprising, in combination therewith, operating connections for all the brakes including parts arranged approximately at the swivelling axes of the front wheels and automatically relieving the pressure on the outer front brake when the front wheels are swivelled, and means operated by said parts additionally to relieve the pressure on the outer rear brake when the front wheels are swivelled.

10. A vehicle having rear brakes and swivelled front wheels, and comprising, in combination therewith, operating connections for the brakes including parts arranged approximately at the swivelling axes of the front wheels and automatically relieving the pressure on the outer rear brake when the front wheels are swivelled.

In testimony whereof I have hereunto signed my name.

MONTGOMERY W. McCONKEY.